United States Patent [19]
Collins et al.

[11] 3,969,154
[45] July 13, 1976

[54] CATASTROPHIC FAILURE OF METALS

[75] Inventors: William H. Collins, Timonium; Richard L. Blucher; Edward R. Evans, both of Baltimore, all of Md.

[73] Assignee: Catalyst Research Corporation, Baltimore, Md.

[22] Filed: June 22, 1960

[21] Appl. No.: 38,073

[52] U.S. Cl. ............................. 148/9 R; 29/413; 225/2; 225/94; 225/96.5; 241/15; 241/38; 266/121; 266/128; 299/16; 299/29
[51] Int. Cl.[2] ............................................ B23K 7/00
[58] Field of Search .................... 75/27; 148/1, 9 R; 29/413; 266/4 E, 4 F; 225/2, 96.5, 94; 241/15, 38; 299/16, 19

[56] References Cited
UNITED STATES PATENTS
2,387,715   10/1945   Cadwell .............................. 15/27

OTHER PUBLICATIONS

Morgan, W. A., "Embrittlement of Solid Metals in a Liquid Metal," in *Metal Treatment and Drop Forging,* Sept. 1954, pp. 333–339.

*Primary Examiner*—Richard E. Schafer
*Attorney, Agent, or Firm*—Brown, Murray, Flick & Peckham

EXEMPLARY CLAIM

1. A method of inducing rapid failure in a shape that is under stress and is composed of cold rolled steel comprising applying against a surface of said cold rolled steel shape a mixture composed of lithium metal, lithium chloride and potassium chloride, rapidly heating that mixture as well as the surface of the steel shape in contact therewith sufficiently to melt the mixture but below the annealing temperature of the steel, and maintaining that temperature until the steel shape cracks.

10 Claims, 4 Drawing Figures

INVENTORS
WILLIAM H. COLLINS
RICHARD L. BLUCHER
EDWARD R. EVANS

CATASTROPHIC FAILURE OF METALS

This invention relates to the catastrophic failure of metals and in particular it is concerned with methods and means for rapidly inducing catastrophic failure in metals.

There is a need for a method and apparatus for rapidly inducing failure in metals. Such an invention could provide a portable demolition device useful for military applications for surreptitiously destroying bridges, enemy weapons and the like. Such an invention could also be particularly useful in metal salvaging and demolition operations particularly for areas where it was either inconvenient or impractical to apply other and conventional methods. It is such an invention that the present specfication discloses.

It is a primary object of the present invention to provide a method and means for inducing catastrophic failure in structural metals, that may be easily practiced and that brings about the desired result quickly and relatively quietly.

This and other objects are attained in accordance with our discoveries in which a material, termed an inoculant, is maintained against a portion of the surface of a metal, in which failure is desired and to which a stress either exists or is applied adjacent that portion of the surface, and is then heated whereupon prompt failure of the metal element is brought about. In this manner, we are able to induce catastrophic failure, particularly in structural elements, under conditions whereby this failure is rapidly accomplished and is effected without the noise and other circumstances characteristic of explosive demolition.

The invention will be most readily understood upon considering its description in conjunction with the attached drawings in which.

Figure 1:
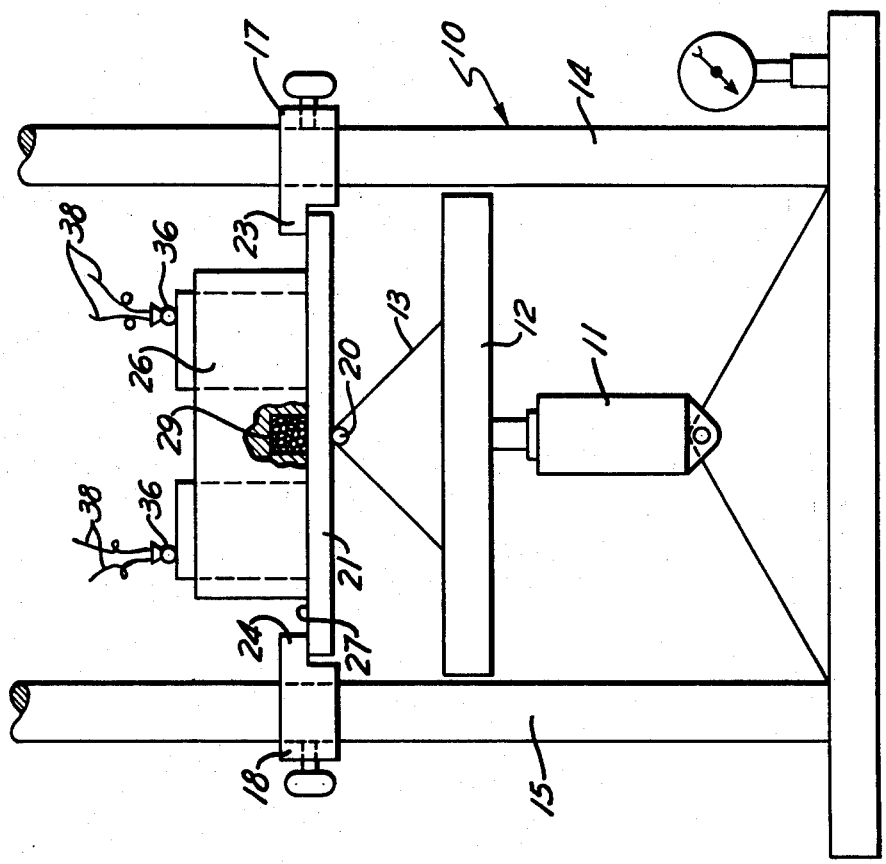
FIG. 1 shows diagrammatically a typical apparatus in accordance with the present invention.

Referring to FIG. 1, the numeral 10 indicates generally a press. The press is composed of a pump 11 adapted to apply force to a supporting plate 12 carrying a fulcrum 13. The press is provided with two legs 14 and 15. Adjustable retaining members 17 and 18 are mounted on legs 14 and 15; these retaining members are capable of resisting the pressure exerted by the pump.

A small metal rod 20 is mounted in the point of the fulcrum. It is through this tip member 20 that the force of the pump is applied. A test specimen or structural element 21 in which failure, such as fracturing, it to be brought about, is laid across this tip 20 of the fulcrum 13, with its ends being restrained from upward movement by the flanges 23 and 24 of retaining members 17 and 18, respectively.

Figure 3:
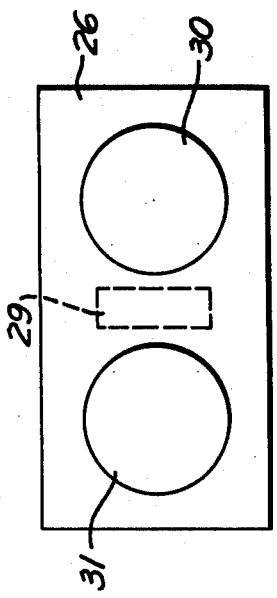
FIG. 3 is a top plan view of the heating and inoculant block of FIG. 1.

A block 26 is placed on the upper surface 27 of the structural element just referred to. The block is provided with a central cavity 29 in its lower central portion, as more easily seen in FIG. 3. The block is also provided with holes or bores 30 and 31 that extend completely through the block.

In operation of this device to induce the catastrophic failure of a metal, a specimen of the metal is laid across the fulcrum 13 and metal rod 20 and retained in place by the retaining members 17 and 18 as shown in FIG. 1. The press is then actuated and the pump applies a stress against the test specimen 27 at the fulcrum. The block 26 is prepared by filling the lower central cavity 29 with a suitable inoculant, hereinafter described, and is then placed on the surface of the test specimen with the inoculant in contact therewith. The bores in the block are filled with a heating composition and the unit is completed by attaching to each of these heating compositions a means capable of igniting them. As shown in FIG. 1 this may be an electric match 36 which is connected to a power source (not shown) by electrical leads 38.

With the stress applied and the block assembled as just stated, the heating compound is set off by actuating the electric match. This releases heat and elevates the temperature of the block, the test specimen and the inoculant, melting the latter. This condition of temperature is maintained for a short period of time whereupon the test specimen breaks, apparently as a consequence of penetration by the inoculant thereby changing the chemical composition and physical properties of the test specimen at that location and inducing failure.

The type of heating means employed for practicing the present invention can vary and is largely dependent upon the conditions under which the invention is to be practiced and the desires of the operator. For certain installations where sufficient auxiliary power is available, electrical heating means can be used. In applying electrical means to the system shown in FIG. 1, the block can be replaced by a resistance element and current passed through it. Preferably, however, a system particularly designed to heat efficiently by electrical power should be used and such is shown in FIG. 2.

Figure 2:
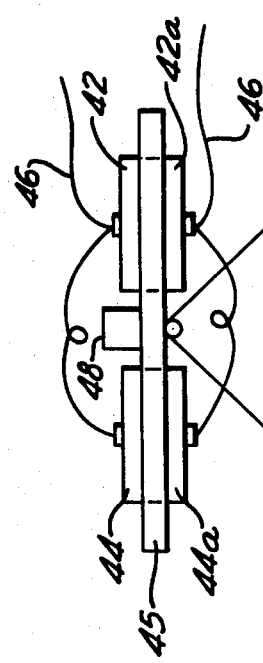
FIG. 2 shows a second embodiment of apparatus designed to applying an inoculant, heat and a stress in accordance with the invention.
Figure 4:
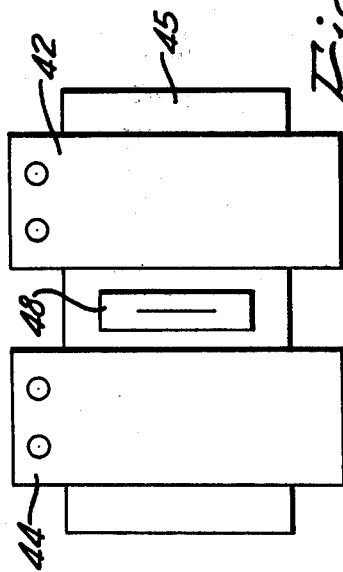
FIG. 4 is a top plan view of the heating and inoculant apparatus of FIG. 2.

Referring to FIG. 2, the numerals 42, 42a, 44 and 44a comprise electrical strip heaters. These can be simple plate-like resistance elements clamped on each side of the test specimen 45. The strip heaters are connected in series by electrical leads 46 and then joined to a power source (not shown). It will be noted that the strip heaters are placed on either side of the inoculant 48 to insure that the latter is heated and melted by these means. A top plan view showing one relative spacing of these members is provided in FIG. 4. In operation, the heaters are actuated and perform as does the heating powder discussed in connection with FIG. 1 above.

The success of this invention has been demonstrated on numerous occasions. As an illustrative example, a test specimen of No. 1018 cold rolled steel (6 × 3 × ¼ inch) was mounted in the test apparatus using a strip heating means as shown in FIG. 2. The press was actuated to apply a stress of 15,000 pounds per square inch to the specimen. A mixture composed of 90 weight per cent of lithium metal and 10 weight per cent of a 50-50 mixture of lithium chloride and potassium chloride was used as the inoculant. The electrical heating strips were applied and the specimen was heated to 400°C. In 3 minutes and 10 seconds the specimen cracked into two sections.

The foregoing experiment was repeated omitting the salt in the inoculant, but was otherwise identical to the foregoing example. In this test the specimen cracked after an exposure of 6 minutes and 40 seconds. From this and similar experiments, it was determined that the salt addition was quite effective in reducing or decreasing the time required for bringing about the cracking phenomenon. It is believed that these salts contribute to more rapid inoculation by removal or penetration of surface films and by reducing surface tension.

In another series of tests generally run along the lines of the above examples, inoculants comprising various mixtures of lithium and calcium were used. The first of these was a 5 weight per cent calcium-95% lithium mixture; the second was a 10 weight per cent calcium-90% lithium mixture; the third was a 20 weight per cent calcium-80% lithium mixture and the fourth a 50-50 weight per cent calcium-lithium mixture. In each of these tests, the specimen cracked at a faster rate than occurred when using the lithium metal inoculant alone but not as rapidly and effectively as the Li-LiCl-KCl mixture first mentioned. In addition to the above inoculants, many other low melting alloys have been successfully used.

In other experiments, the heating block shown in FIG. 1 was used. This block was composed of copper; its central cavity was filled with an inoculant as used in the first example above. The remaining cavities in the block were filled with a total of 80 grams of thermite, which was composed, by weight, of 74.75 per cent of iron oxide and the remainder aluminum metal power. A primer of zirconium-barium chromate heat paper was placed on top of the thermite and the unit completed by the application of an electric match. With a stress of 15,000 pounds per square inch applied to the test specimen (SAE No. 1018 steel) the ignitor was actuated and the thermite burned. The test specimen cracked into two sections in 48 seconds. Preliminary tests indicated that this quantity of thermite raised the inoculant to a maximum temperature of approximately 400°C.

In various other experiments, thermocouples were attached to the various elements and it was determined that the temperature range necessary to regularly induce catastrophic failure in structural metals was about 200° to 800°C. Suitably, the heating is conducted in a manner that does not bring about annealing in the structural shape being destroyed. It is evident that to bring about that condition of temperature under any given circumstance merely requires the designing of the block to hold the proper quantity of heating compound as can be easily calculated.

The inoculants that are useful in the present invention comprise materials that are capable of rapidly penetrating the element that is to be destroyed. In addition, there may be included other components adapted to bring about a particular result. For example, substances that can lower the melting point of the desired inoculant to a suitable level can be included. Other materials that function to break the surface tension or abstract a particular alloying constituent of the structural element can also be used. It will be appreciated that the specific inoculant employed for any given practice will be largely determined by the nature of the structural or other element being destroyed and the conditions under which it is used. In addition to the alkali metal and alkaline earth metal inoculants mentioned above, other moderately low melting point, highly reactive materials can be as readily utilized. Similarly, the addition agents need not be restricted to salts of alkali metals.

Other variations in practice can be made without departing from the scope of the invention. For example a particular application contemplated for the invention is underwater demolition. For use under those conditions, preformed elements sealed against undue attack by water can be used.

The application of a stress to an element that is to be destroyed in accordance with our discoveries need not necessarily by applied by the operator. For example, where a bridge beam support is to be destroyed, the stress is already applied and no additional stress is needed. For other elements, a portable jack or a vise provided with means to give great mechanical advantage to the operator can be used. Since the stress need be applied to but an extremely small area, it will be appreciated that it is fully within the capabilities of human beings to provide stresses of very large orders.

While the method and apparatus have been described above with respect to SAE 1018 steel, it should be understood that the invention is not to be limited to that particular material. Indeed, other materials that have been successfully stressed cracked by the structure shown include SAE No. 4130 steel, No. 4140 cold rolled steel, No. 1060 Spring Steel and grades 410, and 17-7 PH stainless steels. As will be apparent to those skilled in the art, this invention can be applied to various metals and shapes by the artisan merely by appropriate design of the equipment and quantities of materials used in accordance with the principles set forth herein.

From the foregoing description and examples, it is readily apparent that my invention provides a simple, easily practiced way of inducing catastrophic failure in various metals. Moreover, this result can be brought about with a minimum of equipment that is easily obtainable and which causes very rapid destruction of the object being treated without undue noise attending this result.

In accordance with the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

I claim:

1. A method of inducing rapid failure in a shape that is under stress and is composed of cold rolled steel comprising applying against a surface of said cold rolled steel shape a mixture composed of lithium metal, lithium chloride and potassium chloride, rapidly heating that mixture as well as the surface of the steel shape in contact therewith sufficiently to melt the mixture but below the annealing temperature of the steel, and maintaining that temperature until the steel shape cracks.

2. A method in accordance with claim 1 in which the mixture comprises 90 weight per cent of lithium and 10 weight per cent of equal parts of lithium chloride and potassium chloride and the mixture is heated to about 400°C.

3. A method of inducing rapid failure in a ferrous base alloy structural shape that is under stress, comprising the steps of maintaining against a surface of said shape at least one member selected from the group consisting of alkali metals and alkaline earth metals together with an alkali metal halide, rapidly heating said member and said alkali metal halide as well as the surface of said shape in contact therewith to a temperature sufficient to melt said member and halide but below the annealing temperature of the shape, and maintaining that temperature until the shape cracks.

4. A method in accordance with claim 3 in which said member comprises a mixture of lithium and calcium.

5. A method in accordance with claim 3 in which the steel shape is composed of stainless steel.

6. A method according to claim 3 in which the ferrous base alloy is steel.

7. Apparatus for inducing catastrophic failure in a structural metal shape comprising means to apply a stress to a localized area of the surface of the shape, a material selected from the group consisting of alkali metals and alkaline earth metals together with an alkali metal halide, retaining means for maintaining that material at a surface opposite the application of stress therein, heating means extending about said material and its retaining means attached to raise the temperature of said material at least to its melting point and to maintain that temperature for a short period of time.

8. Apparatus in accordance with claim 7 in which said heating means comprises an electric heater.

9. Apparatus in accordance with claim 7 in which said heating means comprises a composition that exothermically reacts, and an ignitor associated therewith.

10. Apparatus according to claim 7 in which said structural shape is a ferrous base alloy.

* * * * *